Sheet 1. 2 Sheets.
C. H. Hunt.
Spinning Mach.
Reissued May 17, 1864.
No. 1,672.
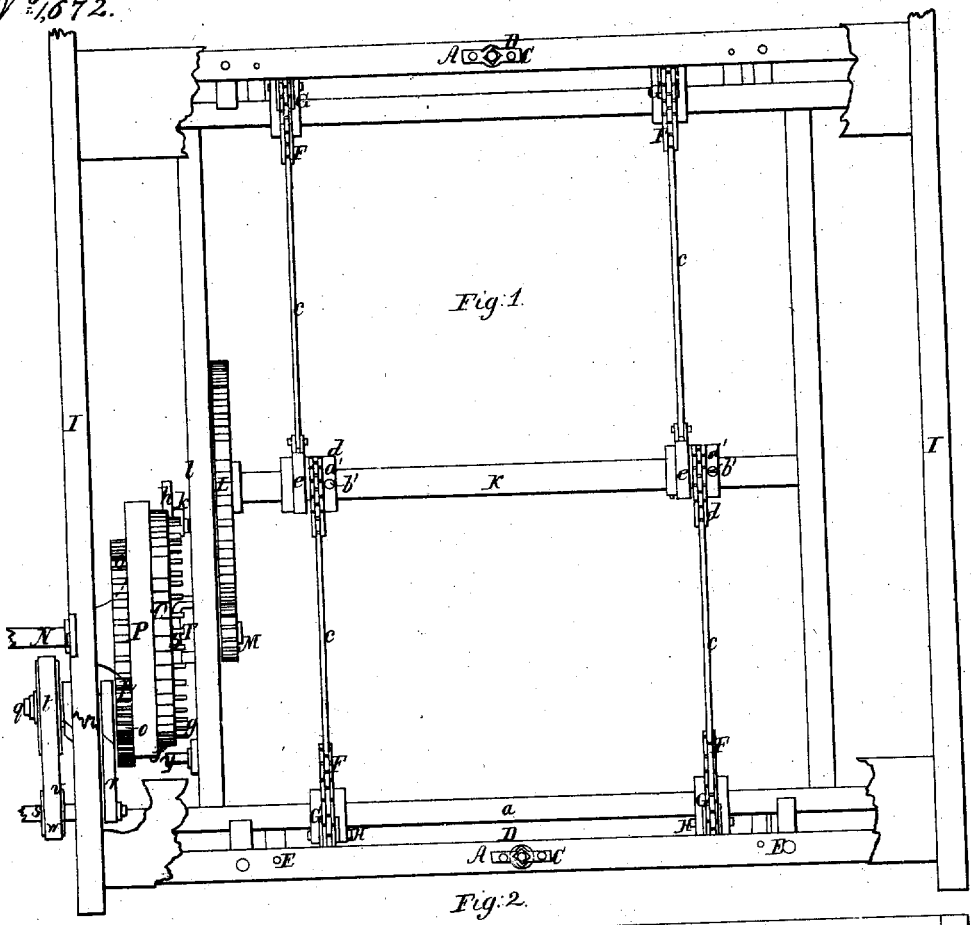
Witnesses
F. P. Hale Jr.
H. B. Shorey
Inventor
Chas. J. Hunt
by his attorney
H. H. Lady.
N. PETERS, PHOTO-LITHOGRAPHER, WASHINGTON, D. C.

Sheet 2. 2 Sheets.

C. H. Hunt.

Spinning Mach.

No. 1,672. Reissued May 17, 1864.

Witnesses

F. P. Hale Jr.

M. E. Shoney

Inventor

Chas. J. Hunt by his Attorney

R. H. Eddy

N. PETERS, PHOTO-LITHOGRAPHER, WASHINGTON, D. C.

UNITED STATES PATENT OFFICE.

CHARLES H. HUNT, OF MADISON, NEW HAMPSHIRE.

IMPROVEMENT IN THROSTLE SPINNING-MACHINES.

Specification forming part of Letters Patent No. 9,283, dated September 28, 1852; Reissue No. 1,672, dated May 17, 1864.

*To all whom it may concern:*

Be it known that I, CHARLES H. HUNT, now a resident of Madison, in the county of Carroll and State of New Hampshire, but late of Lawrence, in the county of Essex and State of Massachusetts, have invented a new and useful improvement in that part of the mechanism of a throstle spinning-machine by which the vertical movements of the spindle are produced and regulated in order to lay the yarn in the proper manner on the bobbin; and I do hereby declare the said invention to be fully described in the following specification and represented in the accompanying drawings, of which—

Figure 3:
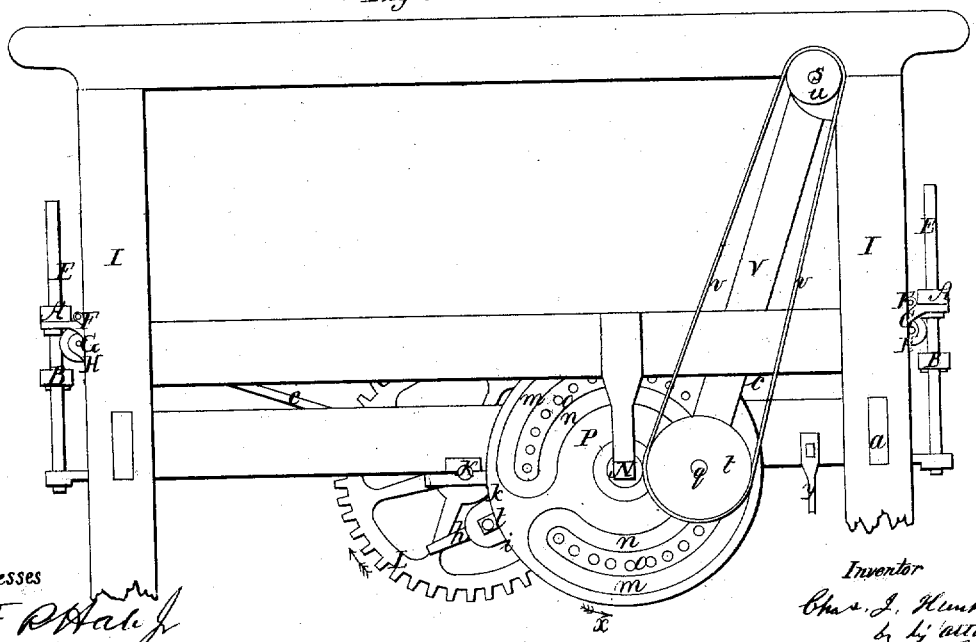

Figure 1 denotes a top view, Fig. 2 a front elevation, and Fig. 3 an end elevation, of a throstle-frame containing it.

In the said drawings, only one spindle and its flier are represented as applied to each of the sides of the frame, it being understood that the spindle and flier-rails of each side are to be supplied with any number of such as may be required.

Figure 4:
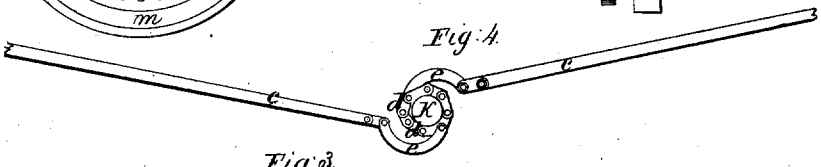

In Figs. 1, 2, and 3 of the drawings, A represents the stationary flier-rail, B the movable spindle-rail, C the flier, D the spindle, E E the stationary guide rods of the spindle-rail. The said spindle-rail is supported by two chains, F F, which are attached to it and respectively pass over two pulleys, G G, disposed in arms H H, extending from the horizontal rail *a* of the frame I. These chains are respectively attached to the ends of long rods or bars *c c*, which have other chains, *d d*, connected to their opposite ends, the said chains *d d* being attached to a horizontal shaft, K, and wound about it, as represented in Fig. 4, which denotes a cross-section of the shaft and shows the said chain, as well as the arc or "goose-neck" or semicircular link *e*, that is employed to extend partly around the shaft when the chain is quite wound up. Each spindle-rail has two of these chains extending from the shaft K, each of the chains being furnished with a goose-neck or curved link, *e*. The mode of connecting each chain *d* with the shaft K is by means of an annular collar, *a'*, which encompasses the shaft and is held or confined to it by a set-screw, *b'*, which screws into the collar and against the shaft, the terminating link of the chain being jointed to one side of the collar. The collar, by fitting loosely on the shaft, becomes capable of being revolved thereon, it being subsequently fixed in place thereon by the set-screw. Thus the collar and its set-screw afford a means of taking up the chain or adjusting it with reference to the shaft as circumstances may require. Each of the curved links or goose-necks *e e* is jointed or hinged directly to its rod *c*, or is connected to it by a separate link, as shown in Fig. 4. By means of these curved links or goose-necks *e e* the shaft K is enabled to partially rotate without producing a movement of the spindle-rails when the frame is first wound up. This enables a "straight" bobbin to be filled or wound at or close to its base, as is required, whereas, were it not for these goose-necks, the spindle-rails would not be operated or stopped properly at the commencement of the operation of filling the bobbins, as the rotation of the shaft K would then produce such a movement of the spindle-rails as would cause them to be raised and lowered regularly throughout the whole operation of filling the bobbins. When the frame is "wound up," the operation of winding is usually continued until those ends of the goose-necks which are the nearer to the shaft K are carried over or around said shaft and into a straight line drawn through the axis of the rods *e e*, or a little past such a line, said line also passing through the center of the shaft K. Thus it will be seen that the said shaft can partially rotate, and that the movement of the spindle-rails will not be so great in proportion to such rotation, or the spindle-rails will not be raised and lowered so far in proportion to the extent of rotation of the shaft when the goose-necks are around or partially around it, as they (the said rails) will after the chains have unwound from the shaft so as to carry the goose-necks away from it by the action of the "let-off" or escapement, hereinafter described. The importance of this part of my invention will be readily understood and appreciated by all practical spinners when it is stated that "filling bobbins" made without "cones" or with "half-cones" can be filled equally as well when the goose-necks are used as described as a "full-cone" bobbin can be filled by the ordinary method.

In the process of laying the yarn on the bobbin the shaft K is not only to have a regular reciprocating movement imparted to it—such as will raise and lower the spindle-rails—but between each two of such movements it is to be turned a little, so as to unwind the chains from it, so as to allow the spindle-rail to drop a short distance in order that the building up of the yarn on the bobbin may take place gradually and regularly—that is to say, when the shaft has partially rotated, as described, in any given position of the spindle-rails before it receives its next reciprocating rotary movement, it is "let-off" or partially turned around, so that such movements will not take place with the shaft in the same position as prior to such letting off, thus unwinding the chains from the said shaft and dropping the spindle-rails, as it were, "a notch at a time," until the bobbin is filled.

Figure 6:
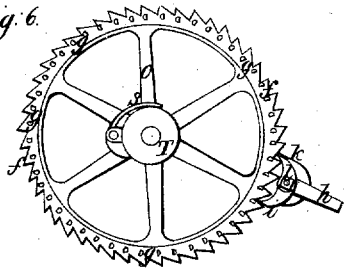
Figure 5:
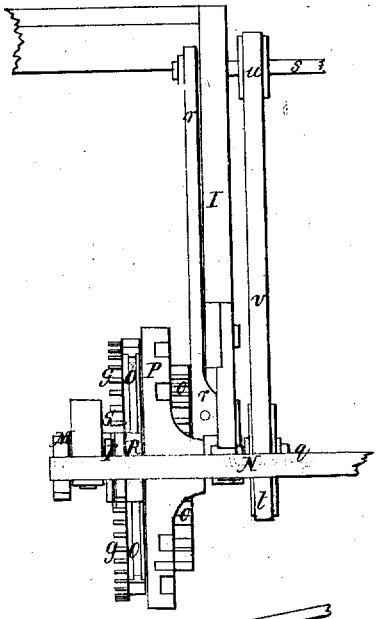

The mechanism to effect such movements may be thus described: A gear-wheel, L, is fixed on the shaft K and made to engage with a pinion, M, which is firmly fastened on the inner end of a horizontal shaft, N. (See Figs. 1 and 5, the latter figure being a section taken through and in the line of the axis of the shaft N.) On the shaft N are two wheels, O P, which run or turn freely on it. The inner of these wheels—viz., the wheel O—has a small ratchet, R, affixed to its inner side. This ratchet works in connection with a spring-click, S, extending from the periphery of a wheel, T, which is fastened to and on the shaft N, the whole being shown in Fig. 6, which is an inner side view of the wheel O. The said wheel O is made not only with ratchet-teeth *f* arranged around its periphery, but with a row, *g*, of pins extended from its inner side, as seen in the drawings, there being the same number of pins or their equivalents as there are ratchet-teeth.

Figure 7:
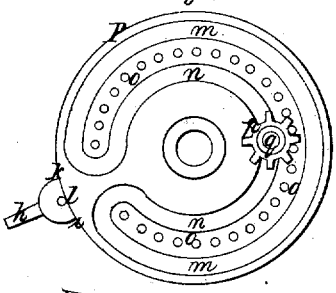

An escapement-lever formed of an arm, *h*, and two pallets, *i k*, arranged with respect to one another as exhibited by the drawings, is applied to, and so as to be capable of rocking or turning on, a fulcrum, *l*, which projects from the wheel P and over the periphery of the wheel O. The pallet *i* of this escapement-lever operates in connection with the ratchet-teeth of the wheel O, while the other pallet—viz., *k*—operates in connection with the row of pins extending from the side of such wheel O. The outer face of the wheel P has two concentric circular grooves or paths, *m m*, made in it, each of which, by means of semicircular grooves at their ends, runs into the other, as shown in Fig. 7, which is a side view of the wheel. Between these grooves there is a concentric row of pins, *o o*, which are arranged at equal distances apart, and so as to engage with a toothed pinion, *p*, fixed on a shaft, *q*, which is supported on the lower end of a pendulous or vibrating arm, *r*, which is hung on a shaft, *s*, suitably supported at the upper part of the frame of the machine. There is a pulley, *t*, fixed on the shaft *q*, and there is also another pulley, *u*, which is fixed on the shaft *s*, an endless belt, *v*, being made to pass around the said pulleys.

By putting the pulley *u* and its shaft *s* in revolution by any suitable means while the throstle-frame is in action, the pinion *p* will be put in revolution, and as the inner end of its shaft is inserted in the path formed by the concentric grooves *m n* and the terminal semicircular grooves, which connect these concentric grooves, the pinion will so act on the row of pins as to produce a reciprocating rotary movement of the wheel P. When the wheel P is so moved as to press the pallet *i* of the escapement-lever against the next adjacent ratchet-tooth of the wheel O, such wheel O will be put in rotation and will continue so until the arm *h* of the escapement comes into contact with a stationary stud or pin, *y*, arranged as shown in the drawings. The pressure of the arm against the stud will cause the pallet *i* to rise on the top of and above the tooth or "escape" over it in a manner similar to that in which the pallet of an escapement of a pendulum escapes over a tooth of its toothed wheel. The two pallets *i k* act on the row or range of ratchet-teeth and pins on the wheel O essentially in manner as do the pallets of a common pendulum-escapement on the wheel thereof, so that at the time the escapement may next be moved in a direction toward the stud *y* such escapement will pass and act against that tooth next to the one it last slipped over. The said slipping by a tooth of the wheel O allows the shaft K to turn a little, so as to allow the spindle rail or rails to drop a little in order to increase the upward wind of the yarn on the bobbin or lower the bobbin a short distance in order that the yarn may be wound higher on it—in other words, the yarn having been wound backward and forward along a section of the bobbin until that section may have become sufficiently filled, by means of the escapement or let-off described the spindle-rails will be dropped a notch or let down a short distance and the yarn will be wound upon another section of the bobbin, a little nearer to the top of the bobbin. The bobbins of the frame having been filled and the frame been "doffed," the next operation before commencing to fill the empty bobbins is to wind up the mechanism hereinbefore described. This may be accomplished by putting a crank on the outer end of the shaft N and turning it in the right direction—viz., that denoted by the arrow *x*—in which case the chains of the shaft K will be wound thereon, so as to elevate the spindle-rails to their highest positions.

It is very important that a mechanism for regulating the movements of the spindle-rails, as described, should operate with certain or positive movements, and have no "dead-points" where they are not required. Prior to my invention, among other devices, what is known as the "heart-motion" or "scroll-cam" has been most generally employed to regulate or govern the filling or "building" of the yarn on the bobbins of spindle-frames, but the numerous difficulties and disadvantages attending the use of such are well-known and understood by all practical spinners. Among the most apparent objections to the mechanism called a heart-motion is the rapidity with which the working parts thereof wear out. As soon as they become worn it is difficult if not impossible to fill or wind the bobbins properly on account of the movements of the mechanism then not being regular, the spindle-rails being stopped for a few seconds at improper points during the operation and then "jumping" or rising or falling with a jerking movement, thus causing the bobbins to be filled in a very uneven manner and producing what is known as "soft," "corduroy," and "snarled" bobbins. The large amount of oil required to lubricate the mechanism properly when the heart-motion is used, is another serious objection to it; but these objections and difficulties are entirely overcome by my invention, as herein described, but comparatively little oil being required to lubricate its mechanism, the movements of the spindle-rails being under perfect control and regular, and a hard and perfect cop or winding being produced.

In what are known as "warp-frames" the bobbins usually have two heads, and the yarn is wound on them in layers which run the whole length of the bobbin between the heads, the spindle-rails being governed in their movements accordingly. I am aware that a mangle-wheel, P, has been used in such frames to produce a regular, reciprocating, rotary movement of the shaft on which the rail-supporting chains are wound; but in such frames no goose-necks and no let-off or escapement, or their mechanical equivalents are used or required from the nature of the work done on them. I therefore do not claim such a mangle-wheel in itself considered; nor do I claim it when used in a spinning-frame and separately from either a let-off or escapement or the goose-necks, or both, or their mechanical equivalents.

What I believe to be new and is claimed by me as my invention is as follows:

1. A combination composed of a let-off or escapement mechanism, or its equivalent, and a reciprocating rotary mangle-wheel or mechanism, the whole being substantially such as described, and to be used in a spinning-machine for operating automatically its spindle rail or rails, or the equivalent thereof, in the manner and for the purpose or purposes hereinbefore specified.

2. The combination of the curved links or goose-necks *e e* with the shaft K and its spindle-rail connections, when the said shaft K has combined with it mechanism, substantially as described, or its equivalent, for turning or operating it in the manner and for the purposes as hereinbefore set forth.

3. The combination of the adjustable annular collars or their equivalents with the shaft K and the chains *d d* and their operative mechanism, as specified.

CHARLES H. HUNT.

Witnesses:
WM. HARMON,
WILLIE R. HARMON.